(12) United States Patent
Meester

(10) Patent No.: US 7,581,375 B2
(45) Date of Patent: Sep. 1, 2009

(54) SMALL SCALE TOMATO HARVESTER

(75) Inventor: David Meester, Fresno, CA (US)

(73) Assignee: Westside Equipment Co., Crows Landing, CA (US)

( * ) Notice: Subject to any disclaimer, the term of this patent is extended or adjusted under 35 U.S.C. 154(b) by 301 days.

(21) Appl. No.: 10/942,078

(22) Filed: Sep. 14, 2004

(65) Prior Publication Data
US 2006/0053765 A1 Mar. 16, 2006

(51) Int. Cl.
A01D 45/00 (2006.01)
(52) U.S. Cl. ..................................... 56/327.1
(58) Field of Classification Search ............... 56/327.1, 56/328.1, 340.1, 330; 171/14, 27
See application file for complete search history.

(56) References Cited

U.S. PATENT DOCUMENTS

| 672,320 | A | | 4/1901 | Ford |
| 2,280,364 | A | | 4/1942 | Atteslander |
| 2,745,238 | A | | 5/1956 | Hopkins |
| 2,757,503 | A | * | 8/1956 | Hart ............................ 53/391 |
| 3,308,924 | A | | 3/1967 | Hecox |
| 3,331,198 | A | | 7/1967 | Hill |
| 3,340,935 | A | | 9/1967 | Csimma |
| 3,390,768 | A | * | 7/1968 | Button ....................... 209/665 |
| 3,413,789 | A | | 12/1968 | Studer |
| 3,473,613 | A | | 10/1969 | Boyce |
| 3,497,084 | A | | 2/1970 | Murrah |
| 3,521,739 | A | * | 7/1970 | McRobert .................... 198/571 |
| 3,566,881 | A | * | 3/1971 | Link et al. ................... 460/144 |
| 3,584,690 | A | | 6/1971 | Taylor |
| 3,613,796 | A | | 10/1971 | Cayton et al. |
| 3,618,617 | A | | 11/1971 | Gates et al. |
| 3,656,488 | A | | 4/1972 | Dumanowski, et al |
| 3,666,017 | A | | 5/1972 | Gates et al. |
| 3,698,171 | A | * | 10/1972 | Hecht ........................... 56/331 |
| RE27,528 | E | | 11/1972 | Looker et al. |
| 3,916,913 | A | | 11/1975 | Looker et al. |

(Continued)

FOREIGN PATENT DOCUMENTS

CA 2272550 5/1998

(Continued)

OTHER PUBLICATIONS

Sandei Series SL Self-propelled. harvesters 7 pages.

(Continued)

Primary Examiner—Alicia M Torres
(74) Attorney, Agent, or Firm—Mark D. Miller; Marcus N. DiBuduo

(57) ABSTRACT

The present invention is a compact fruit-vine harvester and separation system in which the harvested fruit travels along a vertical plane inside the harvester during processing, followed by a single turn for output. The system includes a machine and related methods for harvesting vine-borne crops. The machine is relatively compact, and provides for vine borne crops to be severed, separated, cleaned and machine-sorted along a longitudinal axis before making a single turn prior to exit. Harvested fruit passing through the machine drops by as much as 18 inches less than in other harvesters, thereby reducing the potential for fruit damage. The machine incorporates a combination blower and suction system for efficient removal of unwanted dirt, vegetation and debris, and an optional roller to prevent clogging of the suction system.

30 Claims, 7 Drawing Sheets

U.S. PATENT DOCUMENTS

| | | | |
|---|---|---|---|
| 3,986,561 A * | 10/1976 | Bettencourt et al. | 171/14 |
| 4,033,099 A | 7/1977 | Friedel et al. | |
| 4,060,133 A | 11/1977 | Bettencourt et al. | |
| 4,111,210 A | 9/1978 | Freeman et al. | |
| 4,118,311 A | 10/1978 | Friedel et al. | |
| 4,147,017 A * | 4/1979 | Cortopassi et al. | 56/16.5 |
| 4,157,005 A | 6/1979 | Orlando et al. | |
| 4,174,755 A | 11/1979 | Siri | |
| 4,175,621 A | 11/1979 | Seem | |
| 4,231,439 A | 11/1980 | Hall, Jr. et al. | |
| 4,232,506 A | 11/1980 | Studer | |
| 4,234,045 A | 11/1980 | Porter | |
| 4,257,218 A | 3/1981 | McRobert | |
| 4,262,477 A | 4/1981 | Turold et al. | |
| 4,262,750 A | 4/1981 | Merkley et al. | |
| 4,281,764 A | 8/1981 | Fowler | |
| 4,282,706 A | 8/1981 | Orlando | |
| 4,283,906 A | 8/1981 | Scudder | |
| 4,286,426 A | 9/1981 | Orlando et al. | |
| 4,294,063 A | 10/1981 | Bianchi | |
| 4,329,836 A | 5/1982 | Scudder | |
| 4,335,570 A * | 6/1982 | Fitzmaurice | 56/327.1 |
| 4,336,682 A | 6/1982 | Orlando | |
| 4,340,237 A | 7/1982 | Orlando | |
| 4,341,062 A | 7/1982 | Scudder | |
| 4,418,521 A | 12/1983 | Orlando et al. | |
| 4,426,832 A | 1/1984 | Porter | |
| 4,432,190 A | 2/1984 | Orlando | |
| 4,472,928 A | 9/1984 | Easton | |
| 4,498,569 A | 2/1985 | Tanaka et al. | |
| 4,531,630 A | 7/1985 | Oury et al. | |
| 4,569,188 A | 2/1986 | Alper et al. | |
| 4,570,426 A | 2/1986 | Bettencourt | |
| 4,584,826 A | 4/1986 | Bettencourt et al. | |
| 4,662,162 A | 5/1987 | Bettencourt et al. | |
| 4,793,128 A | 12/1988 | Creed | |
| 4,893,346 A | 1/1990 | Bishop | |
| 4,927,440 A | 5/1990 | Butler et al. | |
| 4,965,993 A | 10/1990 | Butler et al. | |
| 5,088,569 A | 2/1992 | Checcucci | |
| 5,099,636 A | 3/1992 | Yoder | |
| 5,103,623 A | 4/1992 | Herrett | |
| 5,180,122 A | 1/1993 | Christian et al. | |
| 5,197,269 A | 3/1993 | Meester | |
| 5,250,801 A | 10/1993 | Grozinger et al. | |
| 5,296,702 A | 3/1994 | Beck et al. | |
| 5,314,071 A | 5/1994 | Christian et al. | |
| 5,316,519 A | 5/1994 | Johnson | |
| 5,370,579 A | 12/1994 | Brown et al. | |
| 5,372,547 A | 12/1994 | Brown et al. | |
| 5,480,353 A | 1/1996 | Garza, Jr. | |
| 5,491,333 A | 2/1996 | Skell et al. | |
| 5,495,708 A | 3/1996 | Scott et al. | |
| 5,573,459 A | 11/1996 | Meester | |
| 5,585,626 A | 12/1996 | Beck et al. | |
| 5,647,194 A | 7/1997 | Scott et al. | |
| 5,685,773 A | 11/1997 | Meester et al. | |
| 5,702,301 A | 12/1997 | Meester | |
| 5,813,910 A | 9/1998 | Meester et al. | |
| 5,842,334 A | 12/1998 | Slates | |
| 5,860,859 A | 1/1999 | Meester | |
| 5,865,675 A | 2/1999 | Meester | |
| 5,895,910 A | 4/1999 | Christian | |
| 5,901,539 A | 5/1999 | Sandei | |
| 5,908,352 A | 6/1999 | Meester et al. | |
| 5,921,074 A | 7/1999 | Scott et al. | |
| 6,033,305 A | 3/2000 | Perez et al. | |
| 6,257,978 B1 | 7/2001 | Meester | |
| 6,298,644 B1 | 10/2001 | Sandei | |
| 6,350,198 B1 | 2/2002 | Sandei | |
| 6,415,592 B1 | 7/2002 | Borchard | |
| 7,051,505 B2 | 5/2006 | Brannstrom | |
| 2004/0050029 A1 | 3/2004 | Brannstrom | |
| 2006/0053765 A1 | 3/2006 | Meester | |

FOREIGN PATENT DOCUMENTS

| | | |
|---|---|---|
| DE | 4313320 A1 | 10/1994 |
| WO | WO98/21933 A1 | 5/1998 |
| WO | WO2004/006646 A2 | 1/2004 |

OTHER PUBLICATIONS

Guaresi G-89/93 12 pages.
Pomac COSMO/SA/35-COSMO/SR/35 COSMO/SA/35-COSMO/SR/DS/35 10 pages.
Gallignani Polaris 2000 6 pages.
FMC Foodtech—Sandei-Series SL Self-Propelled Harvester- 7 pages Italy.
Guaresi—A complete range of hi-tech tomato harvesters G-89/93-12 pages Italy .
Pomac—Espressioni Di Tecnologia Technical Terms Linea Rossa Raccoglitrici Per Pomodori Tomato Harvesters—10 pages—Italy.
Gallignani—Polaris 2000—6 pages—Italy.

* cited by examiner

SMALL SCALE TOMATO HARVESTER

BACKGROUND OF THE INVENTION

1. Field of the Invention

The present invention relates to machines and methods for harvesting food crops, and more particularly, to an improved small-scale machine and related methods for separating larger volumes of vine-borne crops from their vines while effectively removing unwanted dirt, vegetation and debris, minimizing damage to the fruit itself, and promoting better sorting of fruit.

2. Description of the Prior Art

Vine-borne crops have traditionally been harvested and processed by hand. However, such manual harvesting and processing was often tedious, time-consuming and expensive. Various machines, such as the one disclosed in U.S. Pat. No. 6,033,305, have been developed over the years to automate part, or all, of this process. These machines are able to harvest vine-borne crops from the ground at much faster speeds than humans. However, these machines were often inefficient in other aspects of the harvesting process. Early harvesting machines severed entire plants and dropped them upon the ground, with the desired crops remaining affixed to the plants. Then, collection devices would retrieve the mixture of vegetation, dirt and debris for processing. Human sorters would then be required to sort through the mixture to separate the crops from the rest, and extract the former. The human sorters had to quickly process these mixtures to prevent a backlog. As a result, some suitable crops were lost because they were too far entangled within the plants, or simply overlooked by the human sorters.

Various devices have been developed over the years to improve the mechanized harvesting process, and to minimize the need for human sorters. For example, U.S. Pat. Nos. 4,257,218, 4,335,570, and 6,257,978 all disclose harvesting machines utilizing at least one form of agitating device (such as vibrating shaker heads or conveyor belts) to dislodge tomatoes from the vines. Several harvesting machines, such as those disclosed in U.S. Pat. Nos. 6,257,978 and 6,033,305, also utilize forced air pressure systems to further remove dirt and debris.

Unfortunately, larger is not always better. While wider and larger machines are generally capable of harvesting and processing a higher volume of vine-borne crops, many road and/or field situations make it impossible or impractical to use or bring these large machines in to perform the desired harvesting. Such machines are also more difficult to maneuver. Such limited maneuverability may require the machine operator to spend additional time repositioning the machines to process each row of crops, or cause the machines to inadvertently trample one or more rows. In addition, larger machines tend to weigh more, and the added weight not only affects maneuverability (e.g. turning), it also makes the larger, heavier machines unusable in moist or muddy fields where they tend to bog down. It is therefore desirable to provide a smaller scale machine that is capable of harvesting larger volumes of vine-borne crops.

In addition, the design of many existing large and small-scale machines may cause damage to the fruit by imparting numerous drops and/or turns during processing. Many machines require the fruit to drop a distance of several feet over the course of processing through the machine, and to make several turns during the process. Each drop and each turn provides another point where the fruit may be damaged, so it is desirable to minimize the number and/or distance that the fruit drops through the machine, and to minimize the number of turns the fruit makes as it travels through the machine.

Effective separating and sorting of harvested fruit is also important. More efficient removal of dirt, vegetation, trash and debris as well as more accurate sorting of fruit is possible when the harvested materials are widely dispersed, and not bunched together. Another unfortunate side effect of machines in which the fruit makes multiple turns is that the fruit and associated trash and debris tends to bunch together. Rather than the fruits being evenly spaced upon the conveyors (so that they may be easily examined and processed), these corners cause the fruits to become crowded as they are transported onto an intersecting conveyor sometimes forming windrows, making them more difficult to inspect and sort. This bunching makes removal of the trash and debris more difficult, and once removed, the bunching of the harvested fruit makes sorting more difficult as well. Furthermore, each turn involves a drop from one conveyor to another, risking additional damage to the fruit, and requiring more maintenance and cleanup from breakage. Transverse turns also tend to increase the overall width and size of the harvester machine. All of these consequences make it even more desirable to minimize the number of turns the fruit makes as it travels through the machine.

It is therefore desirable to provide a small-scale vine-borne crop harvesting machine capable of processing a large volume of crops that is usable in a wide variety of field situations where larger machines cannot be used. It is further desirable that the harvesting machine effectively process vine-borne crops with minimum potential damage to the fruit. It is further desirable that the machine provide a minimum number of drops and turns so that the fruit is less susceptible to damage, so that trash and debris may be more effectively removed, and so that the fruit itself may be more efficiently sorted.

SUMMARY OF THE INVENTION

The present invention provides a compact fruit-vine harvester and separation system in which the harvested fruit makes only one ninety-degree turn (for exit) following processing. The system includes a machine and related methods for harvesting vine-borne crops. The machine is relatively compact, having a frame that is dimensioned such that its width is substantially the same as the wheel or track base so that it may travel on narrow roads, and be used in narrow field conditions. The machine provides for vine borne crops to be severed, separated, cleaned and machine-sorted along a longitudinal axis (straight line) before making a single turn just prior to exit. Harvested fruit passing through the machine drops by as much as 18 inches less than drops called for in existing machines. The machine incorporates a combination blower and suction system for efficient removal of unwanted dirt, vegetation and debris.

In particular, a severing device is provided at the forward end of the machine for severing fruit-laden vines from the ground. A first conveyor is provided that brings the severed fruit-laden vines to an upper position in the machine. The severed fruit-laden vines cross an adjustable gap and are delivered onto a second conveyor, the gap allowing loose dirt and debris to fall through the machine to a dirt cross conveyor. The material on this conveyor is passed through a vision system which ejects the red fruit back onto the machine as the dirt and debris pass through to the ground. The fruit-laden vines are then introduced into a rotating shaker having tines that engage and loosen the vines, causing the fruit to be dislodged as it shakes. The dislodged fruit drops onto a second conveyor below the shaker, and the vines are deposited onto a third conveyor. While traveling along the third conveyor, which is provided with large slots or as a wider pitch belted chain so that fruit can pass through, additional agitation may be imparted to the vines to dislodge any remaining fruit which falls through and is returned to the second conveyor. All of the conveyors are set up relatively close to each other so as to minimize the dropping distance of the fruit. These conveyors are all lined up along the same longitudinal axis, so that the fruit and related materials are not turned and remain widely dispersed across the width of the conveyors.

Some dirt, debris, and vegetation may be deposited on the second conveyor along with the dislodged fruit. To remove this remaining trash, the second conveyor delivers the fruit and trash across an adjustable gap in which a strong upward air flow is provided through a nozzle attached to a blower below. The nozzle extends along the width of the second conveyor so that all fruit and trash is affected thereby. The airflow may be adjusted so that it is strong enough to blow away all loose dirt, debris and vegetation without blowing away the fruit itself. The airflow also tends to remove trash and vegetation that may have become adhered to the second conveyor because of moisture or the like. An intake opening for a variable speed suction unit is provided above the gap and blower nozzle to receive and remove all of the trash that is blown free by the lower nozzle. A continuously rotating roller is provided adjacent to the upper intake opening to dislodge any large pieces of vegetation or trash so that the upper opening does not become clogged. The roller itself is preferably smooth so that it does not become entangled with the vegetation or trash, but it may be provided with teeth, lagging, textured covering or tines to engage such materials if so desired. The roller may rotate in either direction, so long as it keeps the vegetation and trash from clogging the intake opening of the upper suction unit.

The cleaned fruit that passes through the blower/suction gap is then deposited onto a fourth conveyor that is also in line with the three previous conveyors. The fourth conveyor takes the fruit to an automatic sorting unit which kicks out unwanted fruit according to its programmed instructions. Since the fruit has not traveled through any turns up to this point, it remains evenly separated on the fourth conveyor thereby improving the sorting process. Then, finally, the fruit makes its one and only turn where it is deposited onto a transversally oriented conveyor. Here, hand sorting is performed, followed by deposit of the fruit onto a final conveyor which takes it up, out and deposits it into a waiting hopper alongside the machine. In an alternative embodiment, the transversally oriented conveyor and the final conveyor are one and the same, making the fruit available for sorting and then elevating it out of the machine to the hopper waiting alongside.

It is therefore a primary object of the present invention to provide a machine for harvesting vine-borne crops in which the harvested fruit travels along a straight path within the machine as the fruit is separated from the vines, cleaned and sorted, prior to making a single turn followed by exit.

It is also an important object of the invention to provide a machine for harvesting vine-borne crops in which the harvested fruit travels a minimal distance from the uppermost to the lowermost point during processing, reducing the overall distance the fruit drops through the machine in order to reduce the potential for damage to the fruit.

It is also an important object of the invention to provide a machine for harvesting vine-borne crops in which the harvested fruit is widely dispersed as it is conveyed through the machine to facilitate better removal of unwanted trash and debris, and to facilitate better sorting of fruit.

It is also an important object of the invention to provide a machine for harvesting vine-borne crops in which unwanted dirt, vegetation and debris is removed through the dual action of an adjustable lower blower device and an adjustable upper suction device that are provided adjacent to each other along the path of travel through the machine.

It is also an important object of the invention to provide a small-scale machine for harvesting large volumes of vine-borne crops that may be deployed in vineyards and fields where larger machines cannot be efficiently used.

It is also an important object of the invention to provide improved methods for harvesting and processing vine-borne crops.

Additional objects of the invention will be apparent from the detailed descriptions and the claims herein.

Figure 1:
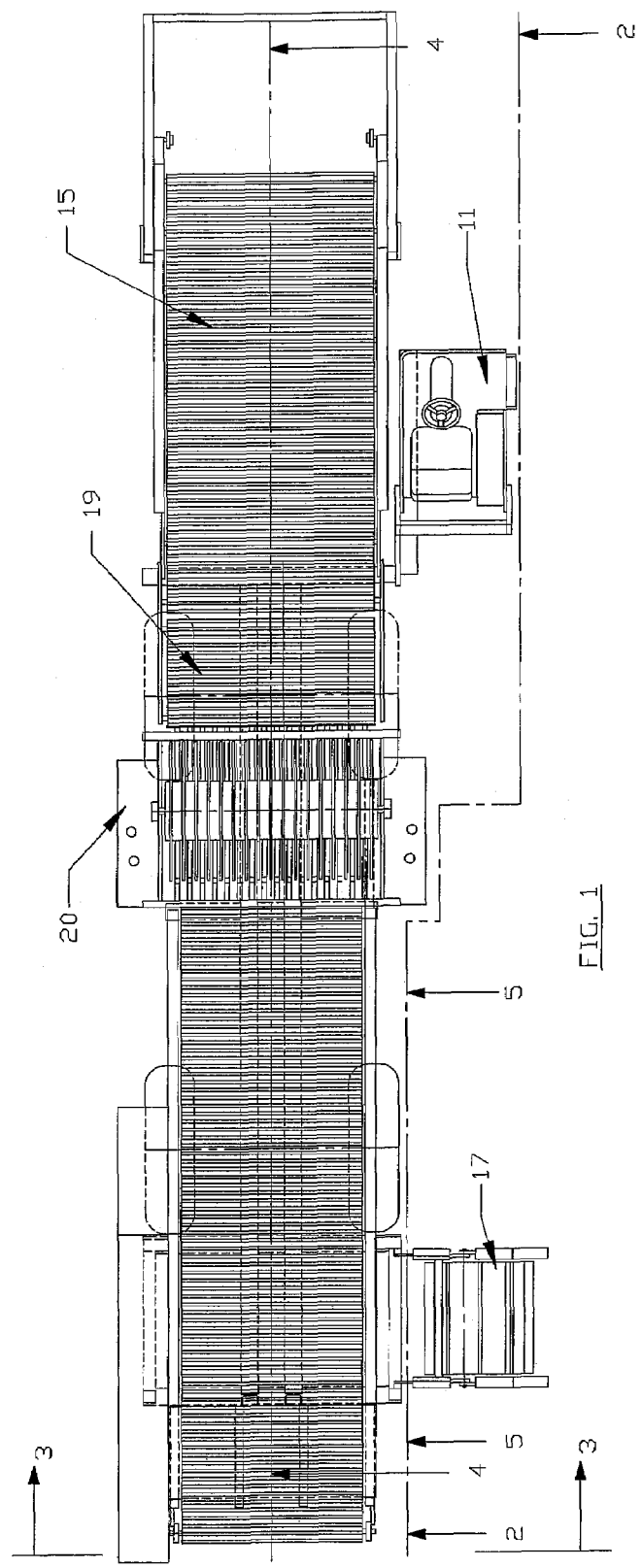
FIG. 1 is a top view of an embodiment of the present invention.
Figure 2:
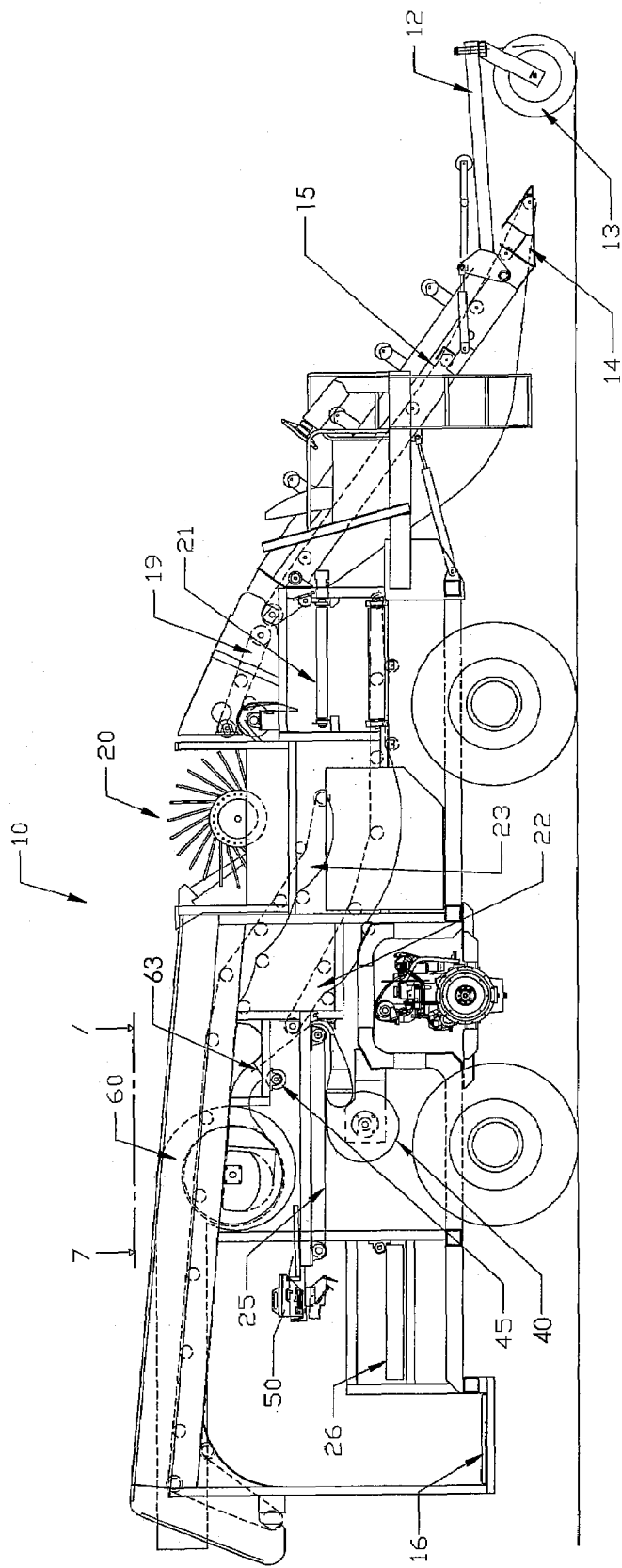
FIG. 2 is a side view of an embodiment of the present invention along line 2-2 of FIG. 1.

Referring to the drawings wherein like reference numerals designate like or corresponding parts throughout the several views, and referring particularly to FIGS. 1 and 2, it is seen that the illustrated exemplary embodiment of the invention is an apparatus and method for harvesting above-ground food plants grown in rows upon elongated planting ridges. The exterior components of the apparatus generally comprise a self-propelled vehicle body 10 having a driving compartment 11, an adjustable arm 12 with a pickup device 14 and conveyor 15, a separator 20, a sorting platform 16, and a discharging chute 17.

Figure 3:
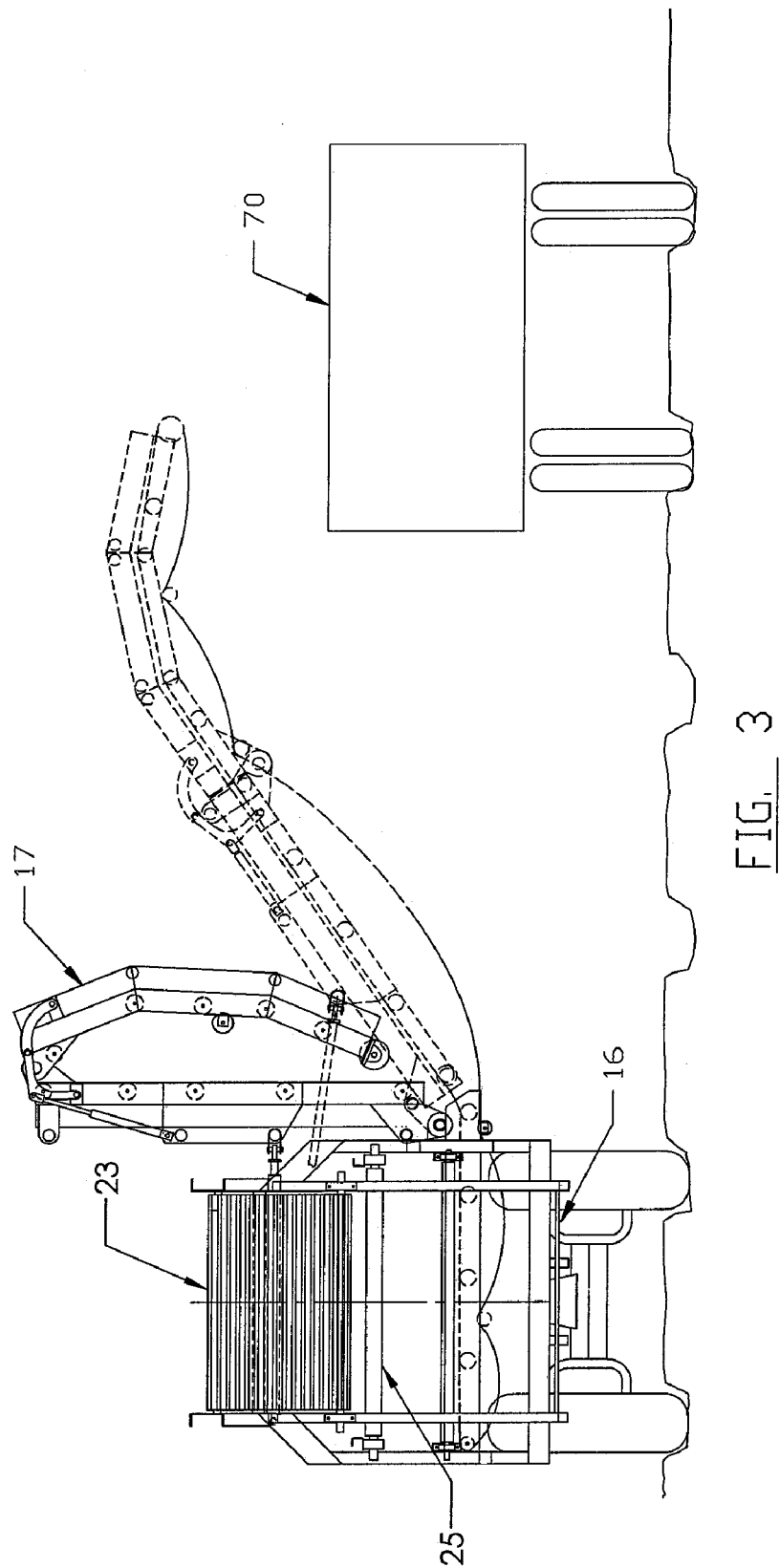
FIG. 3 is a rear view of an embodiment of the present invention along line 3-3 of FIG. 1.

As indicated in FIG. 2, the adjustable arm 12 is affixed to the front end of the vehicle body 10. The adjustable arm 12 may be any number of commercially available devices that allow the operator to adjust the position of the arm 12 relative to the ground, said position depending upon the characteristics of the particular crop harvested or its environment. A gage wheel 13 for height adjustment is mounted at the front end of the adjustable arm 12. The pickup device 14 may be any commercially available device capable of severing tomato vines V at or near ground level, such as a cutting disc or plurality of opposing blades, and a lift for placing the severed vines onto conveyor 15. The pickup conveyor 15 is an endless longitudinal conveyor belt traveling in a rearward direction into the separator 20. The sorting platform 16 is affixed to the rear end of the vehicle body 10. Platform 16 allows one or more humans to examine and hand sort the tomatoes T on conveyor 26 before they are passed along to the discharging chute 17. Chute 17 is depicted in the rear view of FIG. 3 in its retracted position, with phantom lines showing its extended position over a receiving hopper in an adjacent row.

Figure 4:
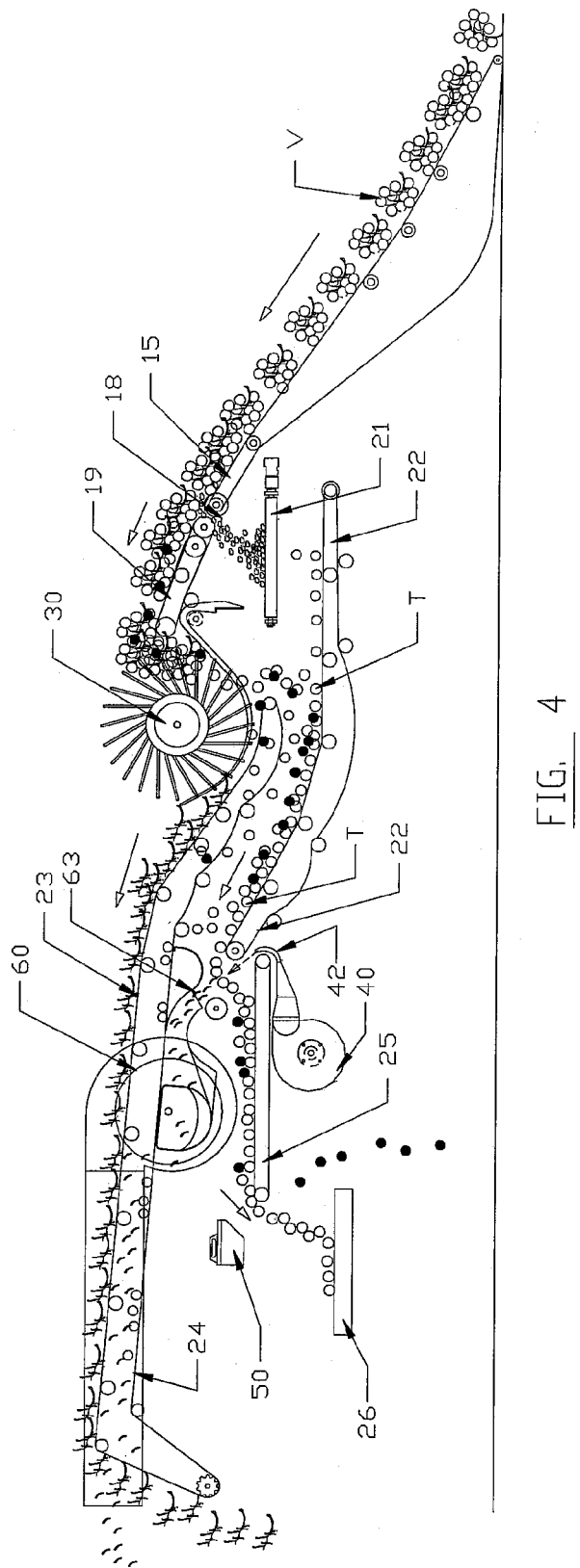
FIG. 4 is a cut away side view along line 4-4 of FIG. 1 illustrating major operative elements of flow paths through the invention.

FIG. 4 depicts the internal operation of the separator 20 viewed from the right side. An endless motor-driven longitudinal receiving conveyor 19 is adapted to receive the tomato vines V from the exterior pickup conveyor 15. Said receiving conveyor 19 travels toward the rear end of the vehicle body 10. An adjustable gap 18 is provided between the pickup conveyor 15 and receiving conveyor 19, said gap 18 allowing loose tomatoes T, dirt clods and other debris to drop from the vines V while said vines travel between the two conveyors 15 and 19. It is to be appreciated that the width of gap 18 may be varied to account for different sizes of vines V, tomatoes T, dirt clods and debris. For example, gap 18 may be set at a sufficiently small size that only the smaller dirt clods and debris fall through, or at a sufficiently large size that larger objects including small loose tomatoes T may also fall through.

An endless transversely oriented motor-driven debris conveyor 21, having one end underneath gap 18 and the opposite end extending outside the vehicle body 10, is positioned to receive the loose tomatoes T, dirt clods and debris falling through gap 18. A commercially available sorting mechanism (not depicted) may be mounted in close proximity to the debris conveyor 21 to recognize loose tomatoes T thereon, and place them onto the endless motor-driven longitudinal first processing conveyor 22, while the remaining dirt clods and debris are transported outside the vehicle body 10. Alternatively, if gap 18 is set at a sufficient size to allow only dirt clods and debris to fall through, the debris conveyor 21 may transport all objects falling through the gap 18 to the outside of the vehicle body 10. Processing conveyor 22 is made up of segments which provide a plurality of openings or slots that are of sufficient size to support tomatoes T, but allow small pieces of dirt, vegetation and debris to fall through. Larger pieces are removed by blower 40 and suction device 60 described below.

A shaker brush 30 is positioned for receiving tomatoes and vines from first processing conveyor 19. Said shaker brush 30 may be any commercially available brush comprising a plurality of tines 31 and an agitating mechanism (not depicted) for concurrently rotating and vibrating the shaker brush 30, such as an eccentric weight assembly or vibrating motor. It is rotatable along a central axis in a downward direction, causing the vines V to be pulled underneath the shaker brush 30 toward the rear end of the vehicle body 10. The vibratory force of the shaker brush 30 is sufficient to dislodge the majority of the tomatoes T from their vines V, along with most remaining dirt clods and debris, without excessively damaging the tomatoes T. The dislodged tomatoes T, dirt clods and debris are dropped onto the first processing conveyor 22, while the vines V (along with any tomatoes T still lodged therein) are deposited upon the recovery conveyor 23.

The recovery conveyor 23 is an endless motor-driven longitudinal conveyor traveling toward the rear end of vehicle body 10. Conveyor 23 is made up of segments which provide a plurality of openings or slots that are of sufficient size to allow tomatoes to fall through. An agitating mechanism (not depicted) may be provided in communication with the recovery conveyor 23. Said agitating mechanism may be any commercially available device for agitating the tomatoes and vines on the recovery conveyor 23. The agitator should be capable of providing loosening vibratory motions to further separate the tomatoes T that remain entangled with the vines V at this stage. A recovery shelf track 24 is positioned underneath the return segment of the recovery conveyor 23 to capture the tomatoes T falling through the slots of the recovery conveyor 23, and, in conjunction with the return movement of the recovery conveyor 23, transport the tomatoes T to the first processing conveyor 22.

The second processing conveyor 25 is an endless motor-driven longitudinal conveyor belt traveling toward the rear end of vehicle body 10. Conveyor 25 is positioned near the rear end of first processing conveyor 22. There is an adjustable gap 28 between the first processing conveyor 22 and the second processing conveyor 25. An air blower 40 is mounted below the front end of the second processing conveyor 25, with the nozzle directed toward the gap 28 between the two conveyors, so that the forced air pressure emitted from the nozzle 42 contacts the tomatoes T, vegetation, dirt and debris falling from the first processing conveyor 22 onto the second processing conveyor 25. Such forced air pressure may be varied so that it is of sufficient strength to separate vegetation, dirt and debris from the tomatoes T, and force said materials upward without blowing the tomatoes themselves away. An air suction device 60, such as a fan or vacuum, is positioned above the gap 28, so that its opening is opposite the nozzle of the air blower 40. The size and shape of this opening may be varied, as discussed below, to assure that equal air suction (vacuum) is provided across the entire path (width) of conveyor 25 and gap 28. The vacuum imparted by this suction device 60 may be varied so that it is of sufficient strength to capture the dirt, vegetation and debris forced upward by the air pressure emitted from the blower 40.

Figure 5:
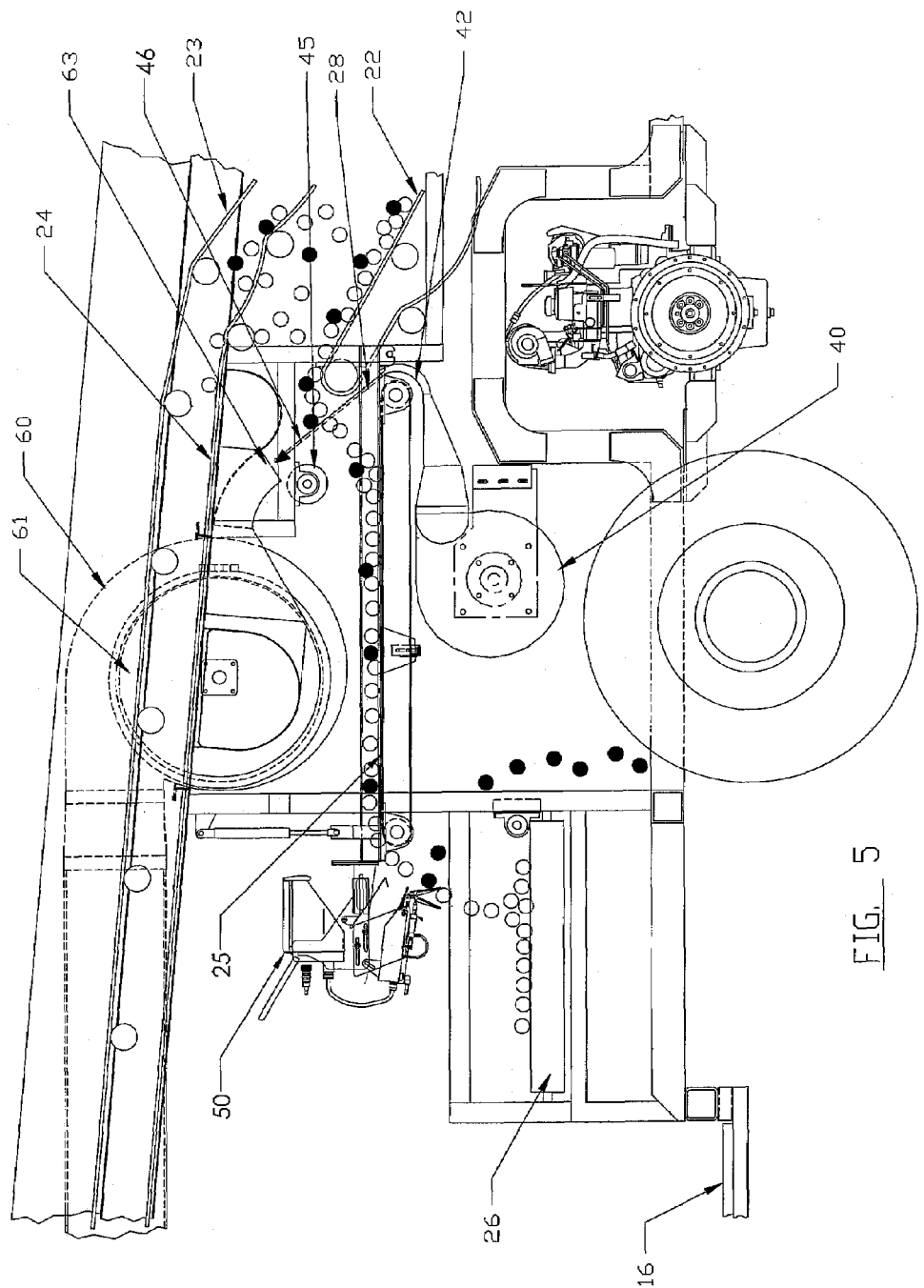
FIG. 5 is a detailed cut away side view along line 5-5 of FIG. 1 of an exemplary air blower, air suction device and mechanical fruit sorter of an embodiment of the present invention.

FIG. 5 provides a detailed side view of the air blower 40 and air suction device 60 of the present invention. As shown therein, the nozzle 42 of the air blower 40 is positioned in close proximity to and across the width of gap 28 between the first processing conveyor 22 and second processing conveyer 25, so that the forced air pressure emitted through nozzle 42 (shown at arrow 46) contacts the tomatoes T, dirt clods and debris falling from the first conveyor 22 to the second 25. The suction device 60 is positioned above the gap 28 with its opening 63 directly across from the nozzle 42, so that the airflow 46 emitted from the nozzle 42 (and the dirt, vegetation and debris carried by such pressure) is directly received by the opening 63 of the suction device 60. The airflow 46 from blower 40 also provides the additional function of dislodging vegetation or debris that may have become adhered to conveyor 22 through moisture or the like, thereby improving the efficiency and operational functionality of conveyor 22.

A roller 45 is provided adjacent to and below the opening 63 of suction device 60, and extends across the width of said opening 63. Roller 45 may have a smooth surface, or it may be provided with teeth, lagging or tines of appropriate length to engage the vegetation and other debris traveling into opening 63. The purpose of roller 45 is to rotate while the suction device 60 is operating so as to make contact with and dislodge any excessive vegetation or other debris in order to prevent opening 63 from being clogged. As shown in FIG. 5, roller 45 may be rotated in a clockwise direction so as to continuously be causing vegetation and debris to be pushed out and away from opening 63. However, this may cause such vegetation and debris to be deposited with the relatively clean tomatoes T on conveyor 25. Thus, in many circumstances, it may be more beneficial for roller 45 to rotate counter-clockwise so as to force the vegetation and debris into opening 63 so that it may be carried away. Among other things, the size and moisture content of the vegetation and debris may dictate whether roller 45 operates in a clockwise or counter-clockwise direction.

Figure 7:
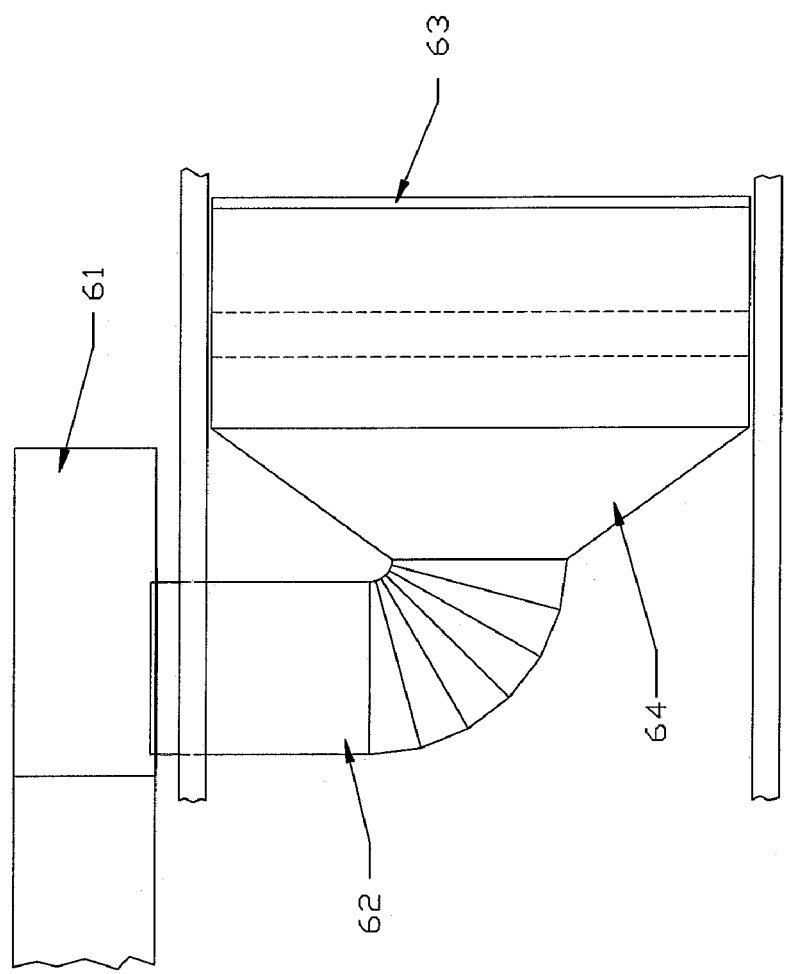
FIG. 7 is a top view of a suction device of an embodiment of the present invention along line 7-7 of FIG. 2.

A side view of suction device 60 is shown in FIG. 5, and a top view is shown in FIG. 7. Suction device 60 includes a variable speed fan or blower unit 61 attached to a channel 62 that is attached, in turn, to a duct 64 leading to opening 63.

Because of the change in direction of airflow through channel 62 and duct 64, the size and shape of opening 63 may be varied so as to provide a uniform level of suction across the entire path of conveyor 25 and gap 28. By way of example and without limitation, opening 63 may not be provided in a rectangular form, but the left side of opening 63 may be more narrow than the right side so as to assure level airflow across its length.

It is to be appreciated that all of conveyors 15, 19, 22, 23 and 25 are provided along the same longitudinal axis, and are operatively positioned above and/or below each other. In this way, the tomatoes T removed from the vines travel along a straight path, moving from the front toward the rear of the machine, being directed only by the conveyors and by gravity. This configuration avoids any left or right turns in the path that the tomatoes T travel through the machine, resulting in better distribution of the tomatoes across conveyor 25 when they reach the sorting stage. Left and right turns in the paths of other machine cause the tomatoes to roll together into windrows that are more difficult to separate and sort.

An endless motor-driven transversely oriented output conveyor 26 is positioned near the rear end of the second processing conveyor 25. A small gap is provided between the second processing conveyor 25 and the output conveyor 26. An optical/mechanical fruit sorter 50 is mounted in close proximity to this gap. The optical/mechanical fruit sorter 50 may be any commercially device capable of selecting or rejecting tomatoes T based upon certain predetermined criteria, such as color. It should also comprise means of sorting tomatoes T based upon their satisfaction of the predetermined criteria, such as a mechanical arm or pivoting gates. It is to be understood that the mechanical fruit sorter 50 may be replaced by, or supplemented with, human sorters who can manually examine the tomatoes on conveyor 26 as they stand on platform 16.

Regardless of the particular examination method utilized, tomatoes T satisfying the predetermined criteria are transported to output conveyor 26, while rejected tomatoes are removed therefrom, either by the mechanical sorter 50 or human sorters. The output conveyor 26 is in communication with the discharging chute 17, which transports the satisfactory tomatoes from the present invention onto any number of commercially available hoppers, such as a trailer or truck bed 70.

Figure 6:
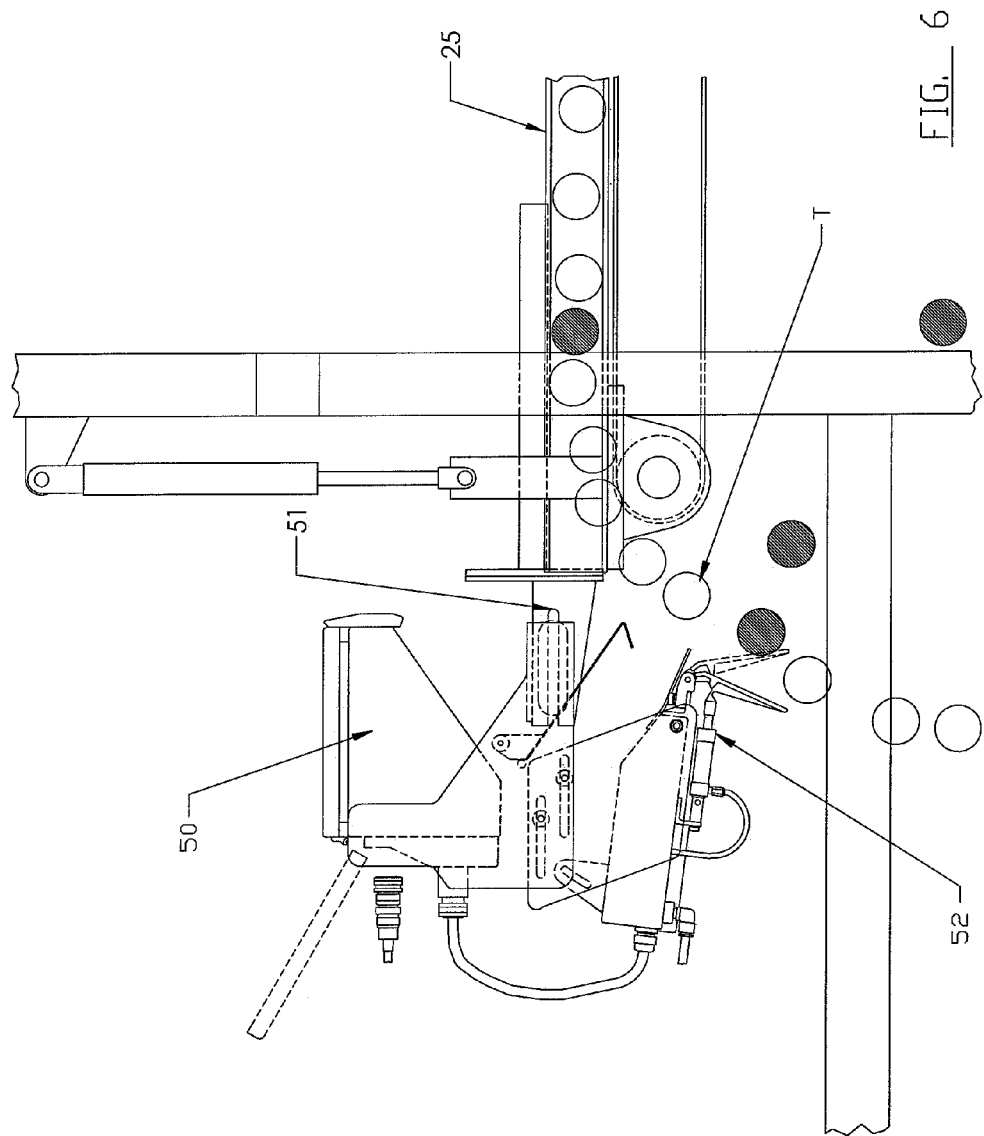
FIG. 6 is a side view of the mechanical fruit sorter of an embodiment of the present invention

FIG. 6 depicts the mechanical fruit sorter 50 of the present invention. It is seen that the mechanical fruit sorter 50 comprises a sensor 51 and pivoting gate 52. The sensor 51 may be any commercially available device capable of determining whether the tomato T satisfies the predetermined criteria inputted by the operator. Tomatoes T satisfying such criteria are permitted to fall toward output conveyor 26. As to tomatoes T, failing such criteria, the fruit sorter 50 causes the gate 52 to pivot outward, causing the failing tomatoes T, to miss the output conveyor 26 and fall outside the vehicle body 10.

The use of a particular embodiment of the present invention will now be described. The operator inputs a series of predetermined criteria into the mechanical fruit sorter 50, which defines the parameters for the 'acceptable' tomatoes harvested. The size of gap 18 is selected and set. The initial airflow for blower 40 and suction 60 is also selected, although these may be changed during processing to provide appropriate removal of debris. The present invention is then positioned before a row of tomato vines V. The adjustable arm 12 is placed in such a manner that the cutting device 14 will sever the tomato vines V at or near ground level. As the present invention proceeds along the row of tomato vines V, cutting device 14 severs the tomato vines V. The pickup mechanism receives the severed tomato vines V (along with loose tomatoes T, dirt clods and debris), and places them onto the pickup conveyor 15. The pickup conveyor 15 then transports the vines V rearward into separator 20.

Inside the separator 20, the tomato vines V are transported over the gap 18 between the pickup conveyor 15 and receiving conveyor 19. As they cross the gap, loose tomatoes T, dirt clods and debris smaller than the width of the gap fall through, and onto the debris conveyor 21. The debris conveyor 21 passes the mixture through a sorting mechanism. Tomatoes T within the mixture are diverted to the first processing conveyor 22, while the dirt clods and debris continue along the debris conveyor 21 to be discarded outside the vehicle body 10.

The tomato vines V upon the receiving conveyor 19 contact the shaker brush 30. As the downward rotation of the shaker brush 30 pulls the tomato vines V underneath the brush, the vibration of the brush tines 31 dislodges the majority of the tomatoes T from the vines V, along with the remaining dirt clods and debris. The dislodged tomatoes T, dirt clods and debris fall onto the first processing conveyor 22, while the vines V (along with any tomatoes T still lodged therein) are deposited by the shaker brush 30 upon the recovery conveyor 23.

As the recovery conveyor 23 transports the vines V toward the rear of the vehicle body 10, it is vibrated by an agitating mechanism. The vibrating motion of said mechanism is sufficient to dislodge the remaining tomatoes T from the vines V. These tomatoes T fall through the slots of the recovery conveyor 23 onto the recovery shelf track 24. The vines continue rearward until they are ejected from the rear end of the vehicle body 10. The return direction of the recovery conveyor 23 receives the tomatoes T and deposits them upon the first processing conveyor 22, along with the tomatoes T dislodged by the shaker brush 30.

The first processing conveyor 22 continues to transport the tomatoes T (and remaining dirt clods and debris) toward the rear end of the vehicle body 10. When the mixture reaches the rear end of the first processing conveyor 22, it falls to the second processing conveyor 25. During the fall, the mixture is struck by air pressure from the air blower 40 mounted underneath the second processing conveyor 25. The air should be of sufficient volume to cause the tomatoes to "dance," that is, to be moved slightly so that the debris and vegetation around them is removed, while the tomatoes themselves are not. Such air pressure causes the dirt and debris to separate from the tomatoes T and fly upward, where they are captured by suction pressure from the air suction device 60. The suction device 60 ejects the dirt clods and debris from the rear end of the vehicle body 10, while the tomatoes T continue along the second processing conveyor 25.

As the tomatoes T reach the rear end of the second processing conveyor 25, they are analyzed by a mechanical fruit sorter 50. Tomatoes T satisfying the particular criteria previously inputted by the operator are transported onto output conveyor 26, while unacceptable tomatoes are discarded out the bottom of the vehicle body 10. The output conveyor 26 transports the acceptable tomatoes T past manual sorters standing on platform 16, and then to the discharging chute 17, where the tomatoes T are placed into storage hoppers 70.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

The invention claimed is:

1. A machine for processing vine-borne crops along a path on a vertical plane extending from front to rear inside the machine comprising:
   a. a self-propelled harvester main frame;
   b. a feeder conveyor along said vertical plane for bringing severed vines with crops rearward along said path to a rotary shaker brush supported by said frame;
   c. a recovery conveyor provided along said vertical plane adjacent to said shaker brush for conveying shaken vines rearward along said path;
   d. a crop return provided along said vertical plane below said recovery conveyor for transporting crops dislodged in said recovery conveyor forward along said path to a removal conveyor;
   e. the removal conveyor provided along said vertical plane and located below the shaker brush for collecting dislodged crops and conveying them rearward along said path;
   f. an upwardly blowing airflow located along said vertical plane downstream from said removal conveyor extending across said path for separating unwanted materials from said dislodged crops; and
   g. a sorter conveyor provided along said vertical plane downstream from said removal conveyor;
   wherein said recovery conveyor, airflow, sorter conveyor and crop return all intersect a vertical axis along said vertical plane.

2. The machine of claim 1 further comprising a sorting device located along said vertical plane at the rear for receiving crops from said sorter conveyor.

3. The machine of claim 1 further comprising an air blower located along said vertical plane below said removal conveyor for generating said upwardly blowing airflow, said blower including a nozzle.

4. The machine of claim 3 further comprising an upper air suction unit having an input opening located along said vertical plane above said blower nozzle for receiving said unwanted materials.

5. The machine of claim 1 further comprising an upper air suction unit having an input opening located along said vertical plane above an end of said removal conveyor for receiving said unwanted materials.

6. A machine for processing vine-borne crops along a path on a vertical plane extending from front to rear inside the machine comprising:
   a. a self-propelled harvester main frame;
   b. a feeder conveyor along said vertical plane for bringing severed vines with crops rearward along said path to a shaker brush supported by said frame;
   c. a recovery conveyor provided along said vertical plane adjacent to said shaker brush for conveying shaken vines rearward along said path;
   d. a crop return provided along said vertical plane below said recovery conveyor for transporting crops dislodged in said recovery conveyor forward along said path to a removal conveyor;
   e. the removal conveyor provided along said vertical plane and located below the shaker brush for collecting dislodged crops and conveying them rearward along said path;
   f. a cleaner comprising an upwardly blowing airflow located along said vertical plane adjacent to a gap extending across said path between said removal conveyor and a sorter conveyor for separating unwanted materials from said dislodged crops;
   g. the sorter conveyor provided along said vertical plane adjacent to said removal conveyor for conveying dislodged fruit rearward along said path;
   h. a sorting device located along said vertical plane at the rear for receiving crops that have passed through said cleaner; and
   wherein said recovery conveyor, airflow, sorter conveyor and crop return all intersect a vertical axis along said vertical plane.

7. The machine of claim 6 wherein said cleaner further comprises an air blower located along said vertical plane below said gap for generating said upwardly blowing airflow, said blower further comprising a nozzle.

8. The machine of claim 7 wherein said cleaner further comprises an upper air suction unit having an input opening located along said vertical plane above said blower nozzle for receiving said unwanted materials.

9. The machine of claim 6 wherein said cleaner further comprises an upper air suction unit having an input opening located along said vertical plane above an end of said removal conveyor for receiving said unwanted materials.

10. A machine for processing vine-borne crops along a path on a vertical plane extending from front to rear inside the machine comprising:
    a. a self-propelled harvester main flame;
    b. a feeder conveyor along said vertical plane for bringing severed vines with crops rearward along said path to a rotary shaker brush supported by said frame;
    c. a recovery conveyor provided along said vertical plane adjacent to said shaker brush for conveying shaken vines rearward along said path;
    d. a crop return provided along said vertical plane below said recovery conveyor for transporting crops dislodged in said recovery conveyor forward along said path to a removal conveyor;
    e. the removal conveyor provided along said vertical plane and located below the shaker brush for collecting dislodged crops and conveying them rearward along said path;
    f. a cleaner comprising an upwardly blowing airflow located along said vertical plane adjacent to a gap extending across said path between said removal conveyor and a sorter conveyor for separating unwanted materials from said dislodged crops;
    g. the sorter conveyor provided along said vertical plane adjacent to said removal conveyor for conveying dislodged fruit rearward along said path; and
    wherein said recovery conveyor, airflow, sorter conveyor and crop return all intersect a vertical axis along said vertical plane.

11. The machine of claim 10 wherein said cleaner further comprises an air blower located along said vertical plane below said gap for generating said upwardly blowing airflow, said blower further comprising a nozzle.

12. The machine of claim 11 wherein said cleaner further comprises an upper air suction unit having an input opening located along said vertical plane above said blower nozzle for receiving said unwanted materials.

13. The machine of claim 10 wherein said cleaner further comprises an upper air suction unit having an input opening located along said vertical plane above an end of said removal conveyor for receiving said unwanted materials.

14. A machine for processing vine-borne crops along a path on a vertical plane extending from front to rear inside the machine comprising:
  a. a self-propelled harvester main frame;
  b. a feeder conveyor along said vertical plane for transporting severed vines with crops rearward along said path to a shaker brush;
  c. a removal conveyor provided along said vertical plane having a portion thereof located below said shaker brush for collecting dislodged crops and conveying them rearward along said path, said removal conveyor terminating inside said machine;
  d. a sorter conveyor provided atong said vertical plane for conveying dislodged crops rearward along said path, one end of said sorter conveyor adjacent to the termination of said removal conveyor defining a gap therebetween, said gap extending across said path;
  e. a cleaner located along said vertical plane adjacent to said gap for separating unwanted materials from said dislodged crops;
  f. a recovery conveyor provided along said vertical plane adjacent to said shaker brush and above said softer conveyor for conveying shaken vines rearward along said path; and
  g. a crop return provided along said vertical plane below said recovery conveyor for transporting crops dislodged in said recovery conveyor forward along said path to said removal conveyor.

15. The machine of claim 14 wherein said cleaner comprises an air blower located along said vertical plane below said gap, said blower having a narrow nozzle outlet extending to said gap for blowing air through said gap.

16. The machine of claim 15 wherein said cleaner further comprises an upper air suction unit having an input opening located along said vertical plane above said blower nozzle for receiving said unwanted materials.

17. The machine of claim 14 wherein said cleaner comprises an upper air suction unit having an input opening located along said vertical plane above an end of said removal conveyor for receiving said unwanted materials.

18. The machine of claim 14 further comprising a rotatable roller located adjacent to said cleaner to prevent clogging of said cleaner.

19. The machine of claim 14 wherein said recovery conveyor, sorter conveyor and crop return all intersect a vertical axis along said vertical plane.

20. The machine of claim 14 wherein said cleaner extends across said gap for separating unwanted materials from said dislodged crops as they cross said gap.

21. The machine of claim 14 wherein said cleaner comprises an upwardly blowing airflow extending across said path.

22. The machine of claim 21 wherein said recovery conveyor, airflow, sorter conveyor and crop return all intersect a vertical axis along said vertical plane.

23. A machine for processing vine-borne crops along a path on a vertical plane extending from front to rear inside the machine comprising:
  a. a self-propelled harvester main frame;
  b. a feeder conveyor along said vertical plane for transporting severed vines with crops rearward along said path to a shaker brush;
  c. a removal conveyor provided along said vertical plane having a portion thereof located below said shaker brush for collecting dislodged crops and conveying them rearward along said path, said removal conveyor terminating inside said machine;
  d. a sorter conveyor provided along said vertical plane for conveying dislodged crops rearward along said path, one end of said sorter conveyor adjacent to the termination of said removal conveyor defining a gap therebetween, said gap extending across said path;
  e. a cleaner located along said vertical plane adjacent to said gap for separating unwanted materials from said dislodged crops; and
  f. recovery conveyor provided along said vertical plane adjacent to said shaker brush and above said sorter conveyor for conveying shaken vines rearward along said path, said recovery conveyor further comprising a crop return for transporting dislodged crops forward along said path to said removal conveyor.

24. The machine of claim 23 further comprising a rotatable roller located adjacent to said cleaner to prevent clogging of said cleaner.

25. The machine of claim 23 wherein said recovery conveyor, sorter conveyor and crop return all intersect a vertical axis along said vertical plane.

26. The machine of claim 23 wherein said cleaner comprises an air blower located along said vertical plane below said gap, said blower further comprising a nozzle.

27. The machine of claim 26 wherein said cleaner further comprises an upper air suction unit having an input opening located along said vertical plane above said blower nozzle for receiving said unwanted materials.

28. The machine of claim 23 wherein said cleaner comprises an upper air suction unit having an input opening located along said vertical plane above an end of said removal conveyor for receiving said unwanted materials.

29. The machine of claim 23 wherein said cleaner comprises an upwardly blowing airflow extending across said path.

30. The machine of claim 29 wherein said recovery conveyor, airflow, sorter conveyor and crop return all intersect a vertical axis along said vertical plane.

* * * * *